United States Patent
Laudel et al.

(10) Patent No.: US 8,593,934 B2
(45) Date of Patent: *Nov. 26, 2013

(54) COMMUNICATION DEVICE AND METHOD FOR PACKET-BASED OFDM COMMUNICATIONS WITH DIFFERING LENGTH CYCLIC PREFIXES

(75) Inventors: Kennan Laudel, San Jose, CA (US); Yongfang Guo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,747

(22) Filed: Jan. 25, 2012

(65) Prior Publication Data

US 2012/0195346 A1     Aug. 2, 2012

Related U.S. Application Data

(63) Continuation of application No. 13/218,122, filed on Aug. 25, 2011, now Pat. No. 8,345,550, which is a continuation of application No. 12/563,280, filed on Sep. 21, 2009, now Pat. No. 8,121,023.

(51) Int. Cl.
  *H04L 5/04* (2006.01)
  *H04B 1/66* (2006.01)
(52) U.S. Cl.
  USPC .......................................... 370/204; 375/240
(58) Field of Classification Search
  USPC ......... 370/210, 229, 231, 252, 431, 464, 465, 370/468
  See application file for complete search history.

(56) References Cited

U.S. PATENT DOCUMENTS

| 6,044,107 | A | 3/2000 | Gatherer et al. |
| 6,678,318 | B1 | 1/2004 | Lai |
| 6,829,296 | B1 | 12/2004 | Troulis et al. |
| 6,834,079 | B1 | 12/2004 | Strait et al. |
| 6,965,617 | B2 | 11/2005 | Hasegawa et al. |
| 6,990,061 | B2 * | 1/2006 | Deneire et al. ................. 370/210 |
| 7,076,010 | B1 | 7/2006 | Heidari et al. |
| 7,230,984 | B2 * | 6/2007 | Martin et al. .................. 375/232 |

(Continued)

FOREIGN PATENT DOCUMENTS

| CN | 102387112 A | 3/2012 |
| KR | 102006001216 | 8/2007 |
| WO | WO-2011034664 A2 | 3/2011 |
| WO | WO-2011034664 A3 | 3/2011 |

OTHER PUBLICATIONS

"U.S. Appl. No. 12/563,280, Notice of Allowance mailed Jun. 10, 2011", 8 pgs.

(Continued)

*Primary Examiner* — Warner Wong
(74) *Attorney, Agent, or Firm* — Schwegman, Lundberg & Woessner, P.A.

(57) ABSTRACT

A network communication device is receive packet-based orthogonal frequency division multiplexed (OFDM) transmissions from one or more other devices in a network over a communication channel. The network communication device may determine a delay spread of the communication channel based on receipt of a probe signal from a transmitting device, configure a channel filter to effectively shorten the channel based on the delay spread, and instruct the transmitting device to shorten a length of a cyclic prefix for subsequent packet-based OFDM transmissions to be received from the transmitting device over the channel.

12 Claims, 4 Drawing Sheets

(56) References Cited

U.S. PATENT DOCUMENTS

| | | | |
|---|---|---|---|
| 7,729,384 B1 | 6/2010 | Mantri et al. | |
| 8,121,023 B2 | 2/2012 | Laudel et al. | |
| 8,345,550 B2 | 1/2013 | Laudel et al. | |
| 8,369,301 B2* | 2/2013 | Cai | 370/344 |
| 8,462,676 B2* | 6/2013 | Ahmadi | 370/295 |
| 2003/0112860 A1 | 6/2003 | Erdogan | |
| 2003/0210742 A1 | 11/2003 | Balakrishnan et al. | |
| 2004/0165674 A1 | 8/2004 | Huang | |
| 2005/0190871 A1 | 9/2005 | Sedarat | |
| 2006/0023798 A1 | 2/2006 | Paek | |
| 2006/0034363 A1 | 2/2006 | Wang et al. | |
| 2006/0126747 A1 | 6/2006 | Wiese | |
| 2006/0153310 A1 | 7/2006 | Tung | |
| 2007/0133695 A1* | 6/2007 | Kotzin | 375/260 |
| 2008/0056393 A1* | 3/2008 | Niu et al. | 375/260 |
| 2008/0225688 A1* | 9/2008 | Kowalski | 370/203 |
| 2008/0232234 A1* | 9/2008 | McCoy et al. | 370/203 |
| 2008/0298241 A1 | 12/2008 | Ohana et al. | |
| 2008/0310364 A1* | 12/2008 | Lu et al. | 370/330 |
| 2009/0063604 A1 | 3/2009 | Tan | |
| 2009/0092154 A1 | 4/2009 | Malik et al. | |
| 2009/0122731 A1 | 5/2009 | Montojo et al. | |
| 2010/0118806 A1 | 5/2010 | Griot et al. | |
| 2010/0142378 A1 | 6/2010 | Matheney et al. | |
| 2010/0142540 A1 | 6/2010 | Matheney et al. | |
| 2010/0158021 A1 | 6/2010 | Kliger et al. | |
| 2010/0162329 A1 | 6/2010 | Ford et al. | |
| 2010/0177815 A1 | 7/2010 | Garg et al. | |
| 2010/0195745 A1 | 8/2010 | Gupta et al. | |
| 2011/0069605 A1 | 3/2011 | Laudel et al. | |
| 2011/0149943 A1* | 6/2011 | Srinivasan et al. | 370/343 |
| 2011/0310950 A1 | 12/2011 | Laudel et al. | |
| 2012/0263135 A1* | 10/2012 | Ahmadi | 370/329 |

OTHER PUBLICATIONS

"U.S. Appl. No. 12/563,280, Notice of Allowance mailed Oct. 4, 2011", 8 pgs.

"U.S. Appl. No. 13/218,122, Notice of Allowance mailed Jan. 13, 2012", 9 pgs.

"International Application Serial No. PCT/US2010/044131 Search Report mailed Mar. 17, 2011", 5 pgs.

"International Application Serial No. PCT/US2010/044131, Written Opinion mailed Mar. 17, 2011", 5 pgs.

"U.S. Appl. No. 13/218,122, Notice of Allowance mailed Aug. 31, 2012", 9 pgs.

"Chinese Application Serial No. 201010297952.6, Office Action mailed Dec. 11, 2012", 5 pgs.

"European Application Serial No. 10817620.7, Response filed to Rule 161 Communication mailed Apr. 27, 2012", 7 pgs.

"International Application Serial No. PCT/US2010/044131, International Preliminary Report on Patentability mailed Apr. 5, 2012", 6 pgs.

\* cited by examiner

COMMUNICATION DEVICE AND METHOD FOR PACKET-BASED OFDM COMMUNICATIONS WITH DIFFERING LENGTH CYCLIC PREFIXES

PRIORITY CLAIM

This application is a continuation of U.S. patent application Ser. No. 13/218,122, filed on Aug. 25, 2011, now issued as U.S. Pat. No. 8,345,550, which a continuation of U.S. patent application Ser. No. 12/563,280, filed on Sep. 21, 2009, now U.S. Pat. No. 8,121,023 both of which are incorporated herein by reference in their entireties.

TECHNICAL FIELD

Embodiments pertain to the packet-based orthogonal frequency division multiplexed (OFDM) communications.

BACKGROUND

Some coaxial networks, such as networks that operate in accordance with the Multimedia over Coax Alliance (MoCA®), use OFDM signals to communicate multimedia content between nodes. One issue with these coaxial networks is multipath. A cyclic prefix, which is a copy of the end of an OFDM symbol placed at the beginning, is often used to address issues associated with multipath. The cyclic prefix is generally long enough to cover the delay spread of the coaxial channel. The cyclic prefixes of each OFDM symbol, however, consume significant bandwidth and therefore reduce throughput.

Thus, there are general needs for communication nodes and methods for communicating multimedia content over coaxial networks that use shorter cyclic prefixes to provide increased throughput. There are also general needs for communication nodes and methods for communicating using OFDM signals over coaxial networks with improved throughput.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
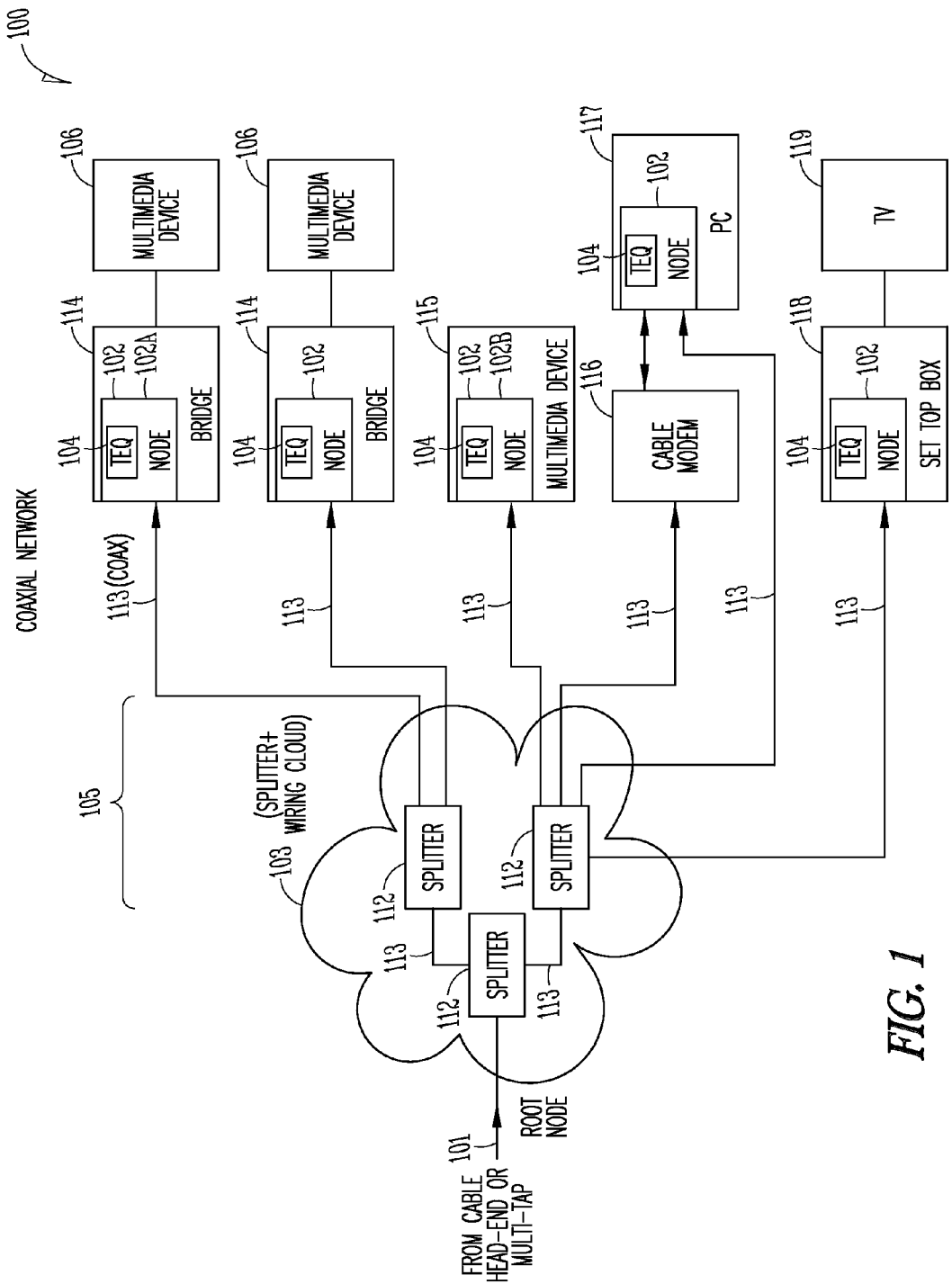
FIG. 1 is a diagram of a coaxial network in accordance with some embodiments.

FIG. 1 is a diagram of a coaxial network in accordance with some embodiments. Coaxial network 100 comprises a plurality of coaxial network communication nodes 102 coupled by coaxial cables 113 and splitters 112 as part of a splitter and wiring cloud 103. Coaxial network 100 may be configured for receiving cable services from a cable head-end or root node 101 and distributing signals to devices such as a cable modem 116 for internet service and a set top box 118 for cable-television services. Cable modem 116 may be a DOCSIS modem and be connected to a personal computer (PC) 117, and set top box 118 may be connected to a television (TV) 119. Nodes 102 may be configured to communicate multimedia content with each other through the splitter and wiring cloud 103 of coaxial network 100.

In some embodiments, one or more of the communication nodes 102 may operate in accordance with the Multimedia over Coax Alliance (MoCA®) specifications, although this is not a requirement. In these embodiments, coaxial network 100 may be considered a MoCA® network. Some communication nodes 102 may be part of bridges 114 and may provide an interface to a multimedia device 106. These bridges 114 may convert multimedia content received over coaxial network 100 from another communication node 102 to a form suitable for use by a multimedia device 106 in accordance with an industry standard interface (i.e., Ethernet or USB). These bridging nodes may also convert multimedia content received directly from a multimedia device 106 to a predetermined form suitable for transmission to another communication node 102 over coaxial network 100. In some embodiments, bridges 114 may operate in accordance with the MoCA® specifications.

Some other communication nodes 102 may be embedded within a multimedia device, such as multimedia device 115, PC 117 or set-top box 118. These embedded or intermediate device nodes may convert multimedia content received over coaxial network 100 from another communication node to a form suitable for the device in which the node is embedded. For example, in the case of a PC 117, an embedded or intermediate device node may convert multimedia content received over coaxial network 100 to a PCI Express standard. These embedded or intermediate device nodes may also convert multimedia content received directly from the device in which they are embedded to a predetermined form for transmission to another communication node 102 over coaxial network 100. Accordingly, any two communication nodes 102 may communicate multimedia content over coaxial network 100.

Multimedia devices 106 and 115 may include any device configured to source or sink multimedia content and may include, for example, personal computers, digital video recorders, personal video recorders (PVR), televisions, digital video disc (DVD) players, etc. Coaxial network 100 may be located in a home or business and communication nodes 102 may allow multimedia content to be communicated over coaxial cables 113 using OFDM communication signals. The signals may be communicated in a time-division multiplexed (TDM) manner and coordinated by a network coordinator. In some embodiments, communication nodes 102 may communicate multimedia in accordance with a MoCA® specification, although the scope of the embodiments is not limited in this respect. Although some embodiments of coaxial network 100 are described herein as a MoCA® network and some embodiments of the communication nodes 102 are described as MoCA® nodes, these embodiments apply to almost any coaxial network and any communication nodes configured accordingly.

In some embodiments, one of the communication nodes 102 may act as the network coordinator to coordinate communications between the communication nodes 102. In these embodiments, the communication nodes 102 may use the same frequency band for communicating and the network coordinator may assign different time-slots to each node for non-interfering communications with another node. A mapping frame or packet may be used to indicate time-slot assignments, although the scope of the embodiments is not limited in this respect.

In accordance with embodiments, each communication node 102 may include, among other things, a channel-shortening time-domain equalizer (TEQ) 104 for use in effectively shortening a channel 105 with another communication node 102 to allow for the use of shorter cyclic prefixes when communicating multimedia content. In these embodiments, a communication node 102, such as communication node 102A, may determine the delay-spread of the coaxial channel 105 based on receipt of a probe from another communication node, such as transmitting node 102B. Communication node 102A may configure its channel-shortening TEQ filter 104 to effectively shorten the channel 105 based on the delay spread, and may instruct the transmitting node 102B to shorten the length of a cyclic prefix for subsequent packet-based transmissions to be received from the transmitting node 102B over the coaxial channel 105. The probe may be stored and reused (e.g., recycled) until the channel-shortening TEQ filter 104 converges. Because the probe is recycled until the channel-shortening TEQ filter 104 converges, convergence can be achieved in a single link-maintenance operation (LMO) (i.e., the receipt of a single probe). In this way, TEQ filter convergence is accelerated allowing channel-shortening fitter coefficients to be obtained in a single LMO cycle rather than after the receipt of several probes of several LMO cycles.

In these embodiments, communication node 102A may receive a probe from communication node 102B allowing communication node 102A to determine the delay-spread of the coaxial channel 105 between communication nodes 102A and communication node 102B based on the probe. The use of a shortened cyclic-prefix may significantly improve throughput because less bandwidth is consumed by the cyclic-prefix. The shortened cyclic prefix is less than the delay-spread of the channel. These embodiments are described in more detail below.

In some embodiments, the coaxial channel 105 may comprise coaxial cables 113 and one or more splitters 112 of splitter and wiring cloud 103. The coaxial channel 105 may also have a multipath delay profile and the packet-based transmissions between nodes 102 may comprise OFDM packet-based transmissions. The packet-based transmissions may be coordinated by the network coordinator in a TDM manner.

Figure 2:
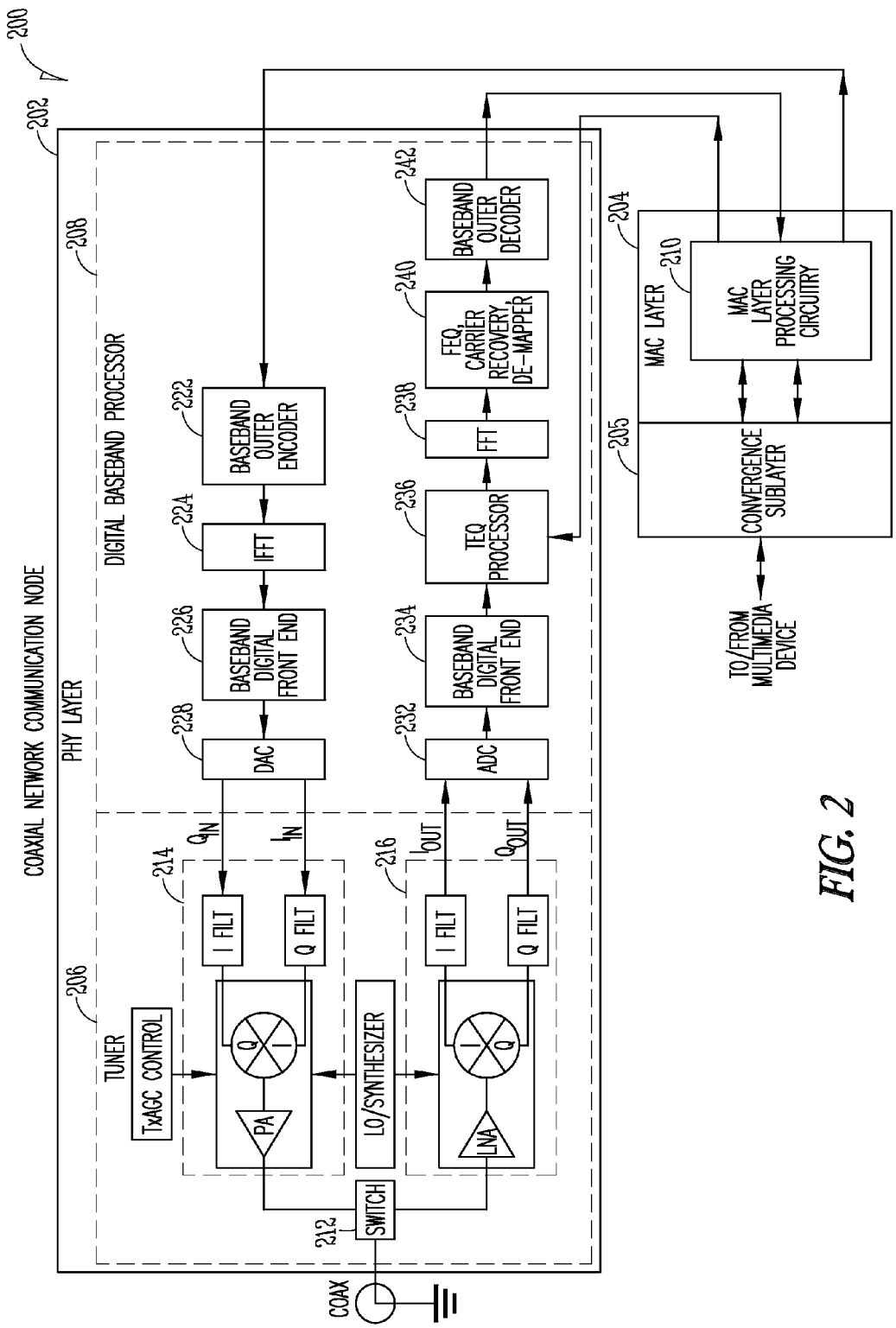
FIG. 2 is a block diagram of a coaxial network communication node in accordance with some embodiments.

FIG. 2 is a block diagram of a coaxial network communication node in accordance with some embodiments. Coaxial network communication node 200 may be suitable for use as any one or more of communication nodes 102 (FIG. 1), although other configurations may also be suitable. Communication node 200 comprises a physical (PHY) layer 202 and a media-access control (MAC) layer 204. The PHY layer may comprise a tuner 206 and a digital baseband processor 208. The tuner 206 may comprise a transmitter 214 and a receiver 216 coupled to a transmit-receive switch 212 for transmitting and receiving over a coaxial cable. In some embodiments, the tuner 206 may be a MoCA® tuner. The MAC layer 204 may comprise layer processing circuitry 210 to perform various MAC layer operations for accessing the media. In some embodiments, communication node 200 may also include convergence sublayer 205. The convergence sublayer 205 may convert multimedia content received from the MAC layer 204 to another form (e.g., a multimedia format such as Ethernet, MPEG, DSS transport and USB) for use by a multimedia device. The convergence sublayer 205 may also convert multimedia content received from a multimedia device to a form suitable for MAC layer 204 for subsequent transmission by PEW layer 202.

In accordance with embodiments, digital baseband processor 208 may include baseband outer encoder 222, inverse fast-Fourier Transform (IFFT) circuitry 224, baseband digital front end circuitry 226 and digital-to-analog converter (DAC) 228 in the transmit path. In the receive path, digital baseband processor 208 may include analog-to-digital converter (ADC) 232, baseband digital front end circuitry 234, TEQ processor 236, fast-Fourier Transform (FFT) circuitry 238, frequency-domain processing circuitry 240 and baseband outer decoder 242. Frequency-domain processing circuitry 240 may perform such functions as frequency equalization (FEQ), carrier recovery and demapping on the frequency-domain signals provided by FFT circuitry 238.

In accordance with embodiments, TEQ processor 236 may include the channel-shortening TEQ filter 104 (FIG. 1) and may configure the channel-shortening TEQ fitter 104 to effectively shorten the coaxial channel 105 based on the delay spread as discussed above. In some embodiments, the TEQ processor 236 may be configured to apply channel-shortening filter coefficients obtained after a final Least-Mean Squares (LMS) adaptation cycle for use when receiving packet-based transmissions with a shortened cyclic prefix from another communication node.

In a situation when the TEQ filter fails to converge or diverge, a shortened cyclic prefix is not used. An initial cyclic prefix, which may be determined based on the measured delay spread of channel, is used.

In these embodiments, the TEQ processor 236 may be configured to determine the delay-spread of the coaxial channel 105 based on receipt of the probe and may configure the channel-shortening TEQ filter to effectively shorten the channel 105 based on the delay spread. MAC layer circuitry 204 may be configured to instruct a transmitting node 102B to shorten the length of the cyclic prefix for subsequent packet-based transmissions by sending a control or configuration packet to the transmitting node 102B. FFT circuitry 238 may convert OFDM packet-based transmissions to frequency domain signals after removal of the shortened cyclic prefix.

In some embodiments, the TEQ processor 236 may correlate the received probe with a local copy of the probe stored in memory to determine the delay spread of the channel. In these embodiments, the probe may include a known sequence and TEQ processor 236 may include a correlator and related circuitry.

In some embodiments, the communication node 200 is further configured to determine whether the delay spread of the channel is shorter than a target channel length. When the delay spread of the channel is shorter than the target channel length, the communication node 200 may refrain from configuring the channel-shortening TEQ filter to effectively shorten the channel 105. The communication node 200 may also refrain from instructing the transmitting node to shorten the length of the cyclic prefix. In these embodiments, the channel-shortening TEQ filter may be disabled when the delay spread of the channel 105 is shorter than the target channel length. These operations may be performed by the correlator and related circuitry of TEQ processor 236.

In some embodiments, the MAC layer 204 may generate instructions (e.g., a control or configuration packet) to instruct the transmitting node 102B to shorten the length of the cyclic prefix for the subsequent packet-based transmissions. The baseband encoder 222 may generate a probe for transmission to one or more other nodes over the coaxial network 100.

In some embodiments, transmitter 214 may be a zero-IF transmitter 214 and receiver 216 may be a zero-IF receiver 216 although the scope of the embodiments is not limited in this respect as non-zero IF transmitters and receivers may be used. In some other embodiments, PHY layer 206 may be implemented without a tuner to allow communication node 200 to operate in baseband-coax mode. In these other embodiments, the digital baseband processor 208 may be coupled directly to the coaxial network 100.

Figure 3:
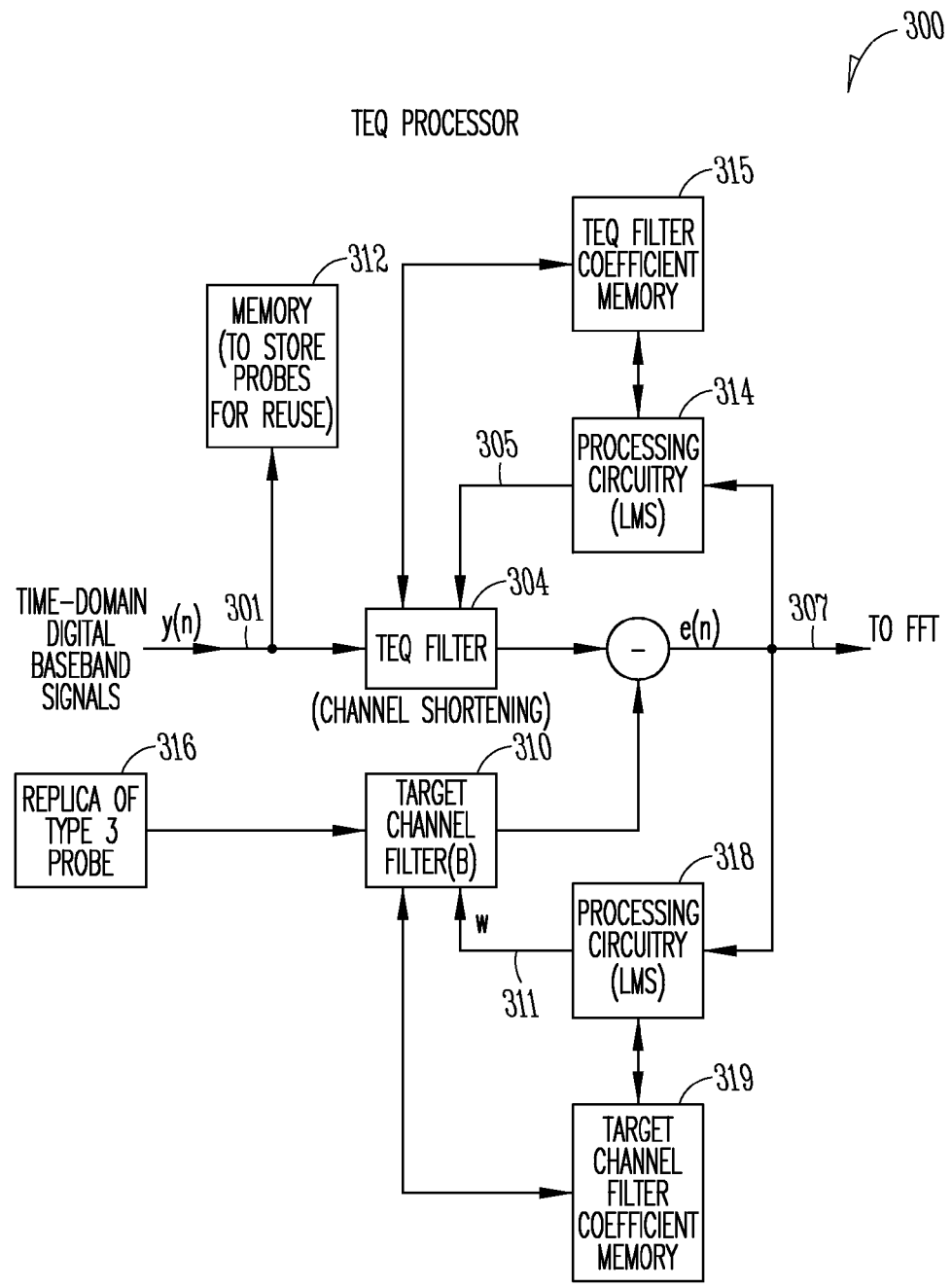
FIG. 3 is a block diagram of a time-domain equalizer (TEQ) processor in accordance with some embodiments.

FIG. 3 is a block diagram of a TEQ processor 300 in accordance with some embodiments. TEQ processor 300 may be suitable for use as TEQ processor 236 (FIG. 2) although other configurations may also be suitable. TEQ processor 300 may process time-domain digital baseband signals y(n) 301 received from baseband digital front-end circuitry 234 (FIG. 2) to provide time-domain output signals 307 to FFT circuitry 238 (FIG. 2).

In accordance with some embodiments, TEQ processor 300 includes channel-shortening TEQ filter 304, memory 312 to store one or more probes received from other communication node, LMS processing circuitry 314 and 318, and targeted-channel filter 310. TEQ processor 300 may also include memory 316 to store a replica of the probe that is uncorrupted by the channel. The channel-shortening TEQ filter 304 may correspond to channel-shortening TEQ filter 104 (FIG. 1). LMS processing circuitry 314 may perform an algorithm to train channel-shortening TEQ filter 304. In some memory-saving embodiments, memory 312 may store only portions of one or more probes.

To perform the LMS algorithm, the TEQ processor 300 may initialize the channel-shortening TEQ filter 304 and the targeted-channel filter 310 and update the channel-shortening TEQ filter 304 and the targeted-channel filter 310 with a predetermined step size. In these embodiments, the probe that is stored in memory 312 may be reused for performing the LMS algorithm until the channel-shortening TEQ filter 304 converges. In some embodiments, the channel-shortening TEQ filter 304 and the targeted-channel filter 310 may be normalized to avoid signal power enhancement. TEQ processor 300 may include memories 315 and 319 to store filter coefficients 305 and 311 respectively.

In some embodiments, TEQ processor may perform LMS training in accordance with the following example code:

```
%% Step 1: Initial the channel-shortening filter w and targeted channel filter b
    numTaps = 63;
    numTarget =5;
    w = zeros(1,numTaps+1) + i*zeros(1, numTaps+1); % w=chennl shortening filter taps
    b = zeros(1,numTarget) +i *zeros(1, numTarget); % b=target channel filter taps
    b= [1 b];
% Step2: LMS Adaptation
    Muw = 0.01; % iteration adaptation step size for w
    Mub = 0.08; % iteration adaptation step size for b
    Deta =8; % the taps of precursors (estimated using Type III Probe)
    for n = abs(deta)+numTaps+1 : numPoints-(abs(deta))
      % select part of training input
      r = SampleDataProbeIII(n : -1 ; n-numTaps) ; % r = received probe from channel
      x = Tp3ProbePkt(n-deta:-1; n-numTarget-deta); % x = local copy of type 3 probe in the
            receiver
      y(n) = sum(w.*r); % vector multiply - FIR filtering operation
      d(n) = sum(b.*x.'); % vector multiply with transpose of x - FIR filtering operation
      % compute error
      e(n) = y(n)-d(n); % error calculation for LMS update computations
      w = w -Muw*e(n)*conj(r); % LMS update equation for channel shortening coefficients
      b = b +Mub*e(n)*conj(x.'); % LMS update equation for target channel coefficients
    end
% Step3: Normalized the final results
    norm_w = sqrt(sum(abs(w).^2));
    w=w/ norm_w
    b=b/ norm_w;
```

In some example embodiments, the channel-shortening TEQ filter 304 may have 64 taps and the targeted-channel filter 310 may have 10 taps, although the scope of the embodiments is not limited in this respect. The channel-shortening TEQ filter 304 may be initialized as (e.g., as 1000000000) to avoid a convergence to all zeros.

In some embodiments, the probe may be an echo-profile probe comprising a single-carrier time-domain signal having a bandwidth substantially equal to a bandwidth of the coaxial channel 105. In some embodiments, the probe may be configured to train the channel-shortening TEQ titter 304 using a LMS algorithm. In embodiments that use channels having a 50 MHz bandwidth, the probe may have a bandwidth substantially equal to 50 MHz.

In some embodiments, the probe may include a preamble, which may be transmitted prior to the probe payload (i.e., the single-carrier time-domain signal). The preamble may also be a single-carrier time domain signal having a bandwidth substantially equal to the bandwidth of the coaxial channel. In these embodiments, the communication node 300 may perform preamble processing at a clock-rate equal to an FFT sample rate. In these embodiments, the preamble processing may be performed by baseband digital front-end circuitry 234. These embodiments allow TEQ and preamble processing at the lowest possible clock domain in which the clock rate is equal to the natural OFDM frequency of the FFT sample rate. Preamble processing may be used to correct timing misalignment of a single-carrier time domain probe. Without probe recycling, preamble processing would need to be employed at a higher-rate clock domain of at least two-times the natural OFDM frequency of FFT sample rate resulting in increased complexity and power consumption. Accordingly, probe recycling in these embodiments reduces complexity and power consumption byre-purposing existing memories to recycle a single received probe to allow convergence of the TEQ filter in a single LMO cycle.

In some embodiments, the probe may be transmitted on a regular basis (e.g., during a link-maintenance operation which may occur approximately every 6 seconds depending on the number of nodes in the coaxial network 100) although the scope of the embodiments is not limited in this respect. The regular transmission of probes may be coordinated by the node acting as the network coordinator.

In some embodiments, the probe may comprise a plurality of samples and the communication node 102 receiving the probe may be configured to store at least some of the samples in the memory 312. In some embodiments, the probe may comprise 1280 samples and each of the samples may be stored in memory 312. In some embodiments, a subset of the samples may be stored in memory (i.e., 256 samples) to reduce memory requirements, although the scope of the embodiments is not limited in this respect.

In some embodiments, the probe may be a Type III echo-profile probe comprising a binary-phase-shift keying (BPSK) single carrier time-domain signal in accordance with a MoCA® specification, although this is not a requirement. In some of these embodiments, the probe may comprise the first 1280 samples out of a PN sequence generator within baseband encoder 222 (FIG. 2). In some embodiments, all nodes 102 of coaxial network 100 may use the same PN sequence for their probes. A replica of this probe (e.g., the sequence) may be stored in memory 316.

In some alternate embodiments, instead of correlating a received probe with a local copy of the probe, a probe, such as Type I probe, with a known sequence across most or all OFDM subcarriers may be used to adapt the TEQ filter 304 of the receiving communication node. The receiving communication node may instruct the communication node that transmitted the probe to use a predetermined cyclic prefix length for subsequent transmissions to the receiving node. In some embodiments, the predetermined cyclic prefix length may be the shortest cyclic prefix specified in the MoCA® specifications, although this is not a requirement. In these embodiments, the received probe may first be processed by the FFT 238 of the receiving communication node.

In some embodiments, the TEQ processor 300 may determine a set of channel-shortening filter coefficients 305 for each of a plurality of other communication nodes based on receipt of a probe from each of the other communication nodes. In these embodiments, the TEQ processor 300 may store the sets of channel-shortening filter coefficients 305 associated with each of the other communication nodes 102 in memory 315. One set of the channel-shortening filter coefficients 305 may be applied to the TEQ filter 304 for receiving a transmission from the associated communication node 102. The MAC layer circuitry 204 (FIG. 2) may be configured to instruct the TEQ processor 236 when to use a particular set of the channel-shortening filter coefficients 305. In this way, the different delay spreads associated with the different channels between the different communication nodes 102 may be taken into account.

In some alternate embodiments, a communication node (e.g., communication node 102A) may instruct another communication node (e.g., communication node 102B) to shorten the length of the cyclic prefix to a predetermined minimum length. In some of these embodiments, the length of the cyclic prefix is configurable and may range from 10 to 64 samples. The predetermined minimum length of the cyclic prefix may be the minimum length of the cyclic prefix specified in the MoCA® specification (e.g., 10 samples), although this is not a requirement. In these embodiments, when the delay spread of the channel is less than the predetermined minimum length, the TEQ processor 236 is not enabled and a cyclic prefix of the predetermined minimum length is used. When the delay spread of the channel is greater than or equal to the predetermined minimum length, the cyclic prefix may be shortened to the predetermined minimum length. In this way, the delay spread of the channel is measured to determine whether the TEQ processor 236 will be enabled.

Although TEQ processor 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs) and combinations of various hardware and logic circuitry for performing at least the functions described herein. In some embodiments, the functional elements of TEQ processor 300 may refer to one or more processes operating on one or more processing elements.

Figure 4:
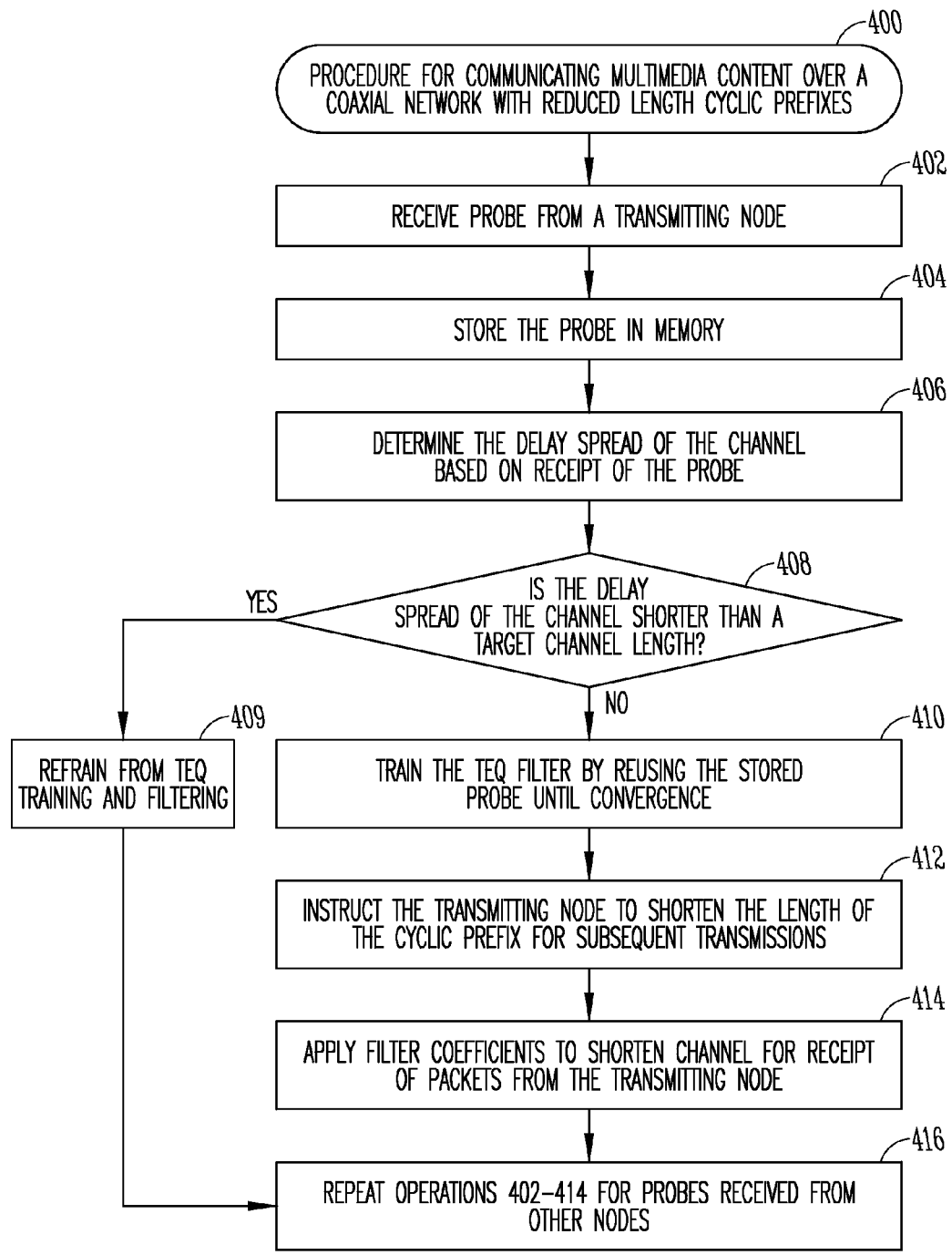
FIG. 4 is a procedure for communicating multimedia content over a coaxial network with reduced-length cyclic prefixes in accordance with some embodiments.

FIG. 4 is a procedure for communicating multimedia content over a coaxial network with reduced-length cyclic prefixes in accordance with some embodiments. Procedure 400 may be performed by any one or more of communication nodes 102 (FIG. 1) for receiving communications from a transmitting node within coaxial network 100 (FIG. 1).

Operation 402 comprises receiving a probe from a transmitting node. The probe may be an echo-profile probe comprising a single-carrier time-domain signal having a bandwidth substantially equal to a bandwidth of the coaxial channel.

Operation 404 comprises storing the received probe in a memory. In some embodiments, the received probe may be stored in memory 312 (FIG. 3).

Operation 406 comprises determining the delay spread of the channel based on the received probe. The TEQ processor 236 (FIG. 2) may correlate the received probe with a local copy of the probe stored in memory 316 (FIG. 3) to determine the delay spread of the channel.

Operation 408 determines whether the delay spread of the channel is shorter than a target channel length. When the delay spread of the channel is shorter than the target channel length, operation 409 is performed. When the delay spread of the channel is not shorter than the target channel length, operation 410 is performed.

Operation 409 comprises refraining from TEQ training and filtering. In these embodiments, reduced-length cyclic prefixes are not used. An initial cyclic prefix, which may be determined based on the delay spread of channel determined in operation 406, is used.

Operation 410 comprises training the TEQ filter by reusing the stored probe until convergence. Convergence of the TEQ filter may occur in a single LMO that includes the receipt of a single probe to allow channel-shortening filter coefficients to be obtained in the single LMO cycle.

Operation 412 comprises instructing the transmitting node to shorten the length of the cyclic prefix for subsequent transmissions to the receiving node.

Operation 414 comprises applying channel-shortening filter coefficients to the TEQ fitter for receipt of packets from the transmitting node. The application of the channel-shortening filter coefficients effectively shortens the channel.

In operation 416, operations 402-412 may be repeated from probes received from other transmitting nodes to allow the use of shortened cyclic prefixes for transmissions from the other transmitting nodes.

Although the individual operations of procedure 400 are illustrated and described as separate operations, one or more of the individual operations may be performed concurrently, and nothing requires that the operations be performed in the order illustrated. For example, probes may be received from other transmitting nodes and channel-shortening filter coefficients may be determined for each transmitting node prior to receipt of multimedia content from a transmitting node.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A network communication device to receive packet-based orthogonal frequency division multiplexed (OFDM) transmissions from one or more other devices in a network over a communication channel, the network communication device configured to:
   determine a delay spread of the communication channel based on receipt of a probe signal from a transmitting device;
   configure a channel filter to effectively shorten the channel based on the delay spread; and
   instruct the transmitting device to shorten a length of a cyclic prefix for subsequent packet-based OFDM transmissions to be received from the transmitting device over the channel, the length being less than the delay spread of the channel and greater than a delay spread of the effectively shortened channel; and
   process the subsequent packet-based OFDM transmissions through the configured channel filter.

2. The network communication device of claim 1 wherein use of the configured channel filter to effectively shorten the channel allows the communication of the subsequent packet-based OFDM transmissions with a shortened length cyclic prefix when a length of the cyclic prefix is less than the delay spread of the communication channel and greater than the delay spread the effectively shortened channel.

3. The network communication device of claim 1 further comprising a physical (PHY) layer and a media-access control (MAC) layer, the PHY layer including baseband digital front-end circuitry and fast-Fourier transform (FFT) circuitry,
   the baseband digital front-end circuitry to convert the packet-based OFDM transmissions received from the transmitting device over the channel to digital baseband signals, and
   the FFT circuitry to perform an FFT on the digital baseband signals to generate frequency domain signals for subsequent demapping and decoding,
   wherein the MAC layer is to operate on a decoded output from the PHY layer.

4. The network communication device of claim 1 wherein the cyclic-prefix is a reduced-length cyclic prefix, and
   wherein the network communication device is further configured to receive uplink packet-based OFDM transmissions with the reduced-length cyclic prefix from the transmitting device,
   wherein the probe signal comprises a reference signal, and
   wherein the transmitting device comprises user equipment.

5. The network communication device of claim 4 further configured to transmit a mapping frame to indicate a resource assignment for the packet-based OFDM transmissions from the transmitting device,
   wherein the resource assignment comprises an assignment of one or more blocks of subcarriers in frequency and a number of symbols in time.

6. A communication device to receive packet-based orthogonal frequency division multiplexed (OFDM) transmissions from one or more other devices in a communication network over a communication channel, the communication device comprising an OFDM transceiver configured to:
   determine a delay spread of the communication channel based on receipt of a reference signal from a transmitting device;
   instruct the transmitting device to use either a shorter-length cyclic prefix or a longer-length cyclic prefix for subsequent packet-based OFDM transmissions to be received from the transmitting device over the channel based on the delay spread; and
   receive packet-based OFDM transmissions in accordance with either the shorter-length cyclic prefix or the longer-length cyclic prefix from the transmitting device,
   wherein the longer-length cyclic prefix is an extended-length cyclic prefix and the shorter-length cyclic prefix is a normal-length cyclic prefix,
   wherein the extended-length cyclic prefix is used for channels with a higher delay spread and the normal-length cyclic prefix is used for channels with a lower delay spread, and
   wherein a number of symbols per frame is reduce when the extended-length cyclic prefix is used, and
   wherein the OFDM transceiver is further configured to transmit a mapping frame to indicate a resource assignment of the OFDM transmissions for the packet-based OFDM transmissions from the transmitting device.

7. The communication device of claim 6 further comprising a physical (PHY) layer and a media-access control (MAC) layer, the PHY layer including baseband digital front-end circuitry and fast-Fourier transform (FFT) circuitry,
   the baseband digital front-end circuitry to convert the packet-based OFDM transmissions received from the transmitting device over the channel to digital baseband signals, and
   the FFT circuitry to perform an FFT on the digital baseband signals to generate frequency domain signals for subsequent demapping and decoding,
   wherein the MAC layer is to operate on a decoded output from the PHY layer.

8. The communication device of claim 7
   wherein the resource assignment comprises an assignment of one or more blocks of subcarriers in frequency and a number of symbols in time, the number of symbols based on whether the normal-length cyclic prefix or the extended-length cyclic prefix is to be used.

9. The communication device of claim 8 wherein the transmitting device comprises user equipment.

10. A method performed by a communication device for communicating packet-based orthogonal frequency division multiplexed (OFDM) transmissions with different length cyclic prefixes, the method comprising:
    determining a delay spread of a communication channel based on receipt of a reference signal from a transmitting device;
    instructing the transmitting device to use either a normal-length cyclic prefix or a longer-length cyclic prefix for subsequent packet-based OFDM transmissions to be received from the transmitting device over the channel based on the delay spread;

receiving the subsequent packet-based OFDM transmissions in accordance with either the normal-length cyclic prefix or the longer-length cyclic prefix from the transmitting device, and transmitting a mapping frame to indicate a resource assignment of the OFDM transmissions for the packet-based OFDM transmissions from the transmitting device, wherein the longer-length cyclic prefix is an extended-length cyclic prefix and the shorter-length cyclic prefix is a normal-length cyclic prefix, wherein the extended-length cyclic prefix is used for channels with a higher delay spread and the normal-length prefix is used for channels with a lower delay spread, and wherein a number of symbols per frame is reduced when the extended-length cyclic prefix is used.

11. The method of claim 10 wherein the resource assignment comprises an assignment of one or more blocks of subcarriers in frequency and a number of symbols in time, the number of symbols based on whether the normal-length cyclic prefix or the extended-length cyclic prefix is to be used.

12. A communication device to receive packet-based orthogonal frequency division multiplexed (OFDM) transmissions from one or more other devices in a communication network over a communication channel, the communication device comprising OFDM transceiver configured to:

receive a reference signal from a transmitting device and an indication as to whether the transmitting device is to use either a shorter-length cyclic prefix or a longer-length cyclic prefix for subsequent packet-based OFDM transmissions to be received from the transmitting device over the channel;

receive packet-based OFDM transmissions in accordance with either the shorter-length cyclic prefix or the longer-length cyclic prefix from the transmitting device; and transmit a mapping frame to indicate a resource assignment of the OFDM transmissions for the packet-based OFDM transmissions from the transmitting device, wherein the longer-length cyclic prefix is an extended-length cyclic prefix and the shorter-length cyclic prefix is a normal-length cyclic prefix, wherein the extended-length cyclic prefix is used for channels with a higher delay spread and the normal-length cyclic prefix is used for channels with a lower delay spread, and wherein a number of symbols per frame is reduced when the extended-length cyclic prefix is used.

* * * * *

UNITED STATES PATENT AND TRADEMARK OFFICE
CERTIFICATE OF CORRECTION

PATENT NO. : 8,593,934 B2
APPLICATION NO. : 13/357747
DATED : November 26, 2013
INVENTOR(S) : Laudel et al.

It is certified that error appears in the above-identified patent and that said Letters Patent is hereby corrected as shown below:

On the Title page, item (57), "Abstract", in column 2, line 1, after "is", insert --to--, therefor On Title page 2, in column 2, References Cited under "Other Publications", line 5, delete "PCT/US2010/044131" and insert --PCT/US2010/044131,--, therefor In the Claims In column 10, line 28, in Claim 6, delete "reduce" and insert --reduced--, therefor In column 11, line 13, in Claim 10, before "prefix", insert --cyclic--, therefor In column 12, line 2, in Claim 12, after "comprising", insert --an--, therefor Signed and Sealed this
Fifth Day of August, 2014

Michelle K. Lee
*Deputy Director of the United States Patent and Trademark Office*